United States Patent [19]

Hettwer

[11] Patent Number: 5,022,697

[45] Date of Patent: Jun. 11, 1991

[54] TRUCK RAMP ANTI-THEFT SYSTEM

[75] Inventor: James C. Hettwer, Grand Forks, Minn.

[73] Assignee: U-Haul International, Inc., Phoenix, Ariz.

[21] Appl. No.: 539,571

[22] Filed: Jun. 20, 1990

[51] Int. Cl.[5] .............................................. B60P 1/43
[52] U.S. Cl. .................... 296/37.6; 70/238; 70/258; 280/783; 414/537
[58] Field of Search .................... 280/164.1, 166, 749, 280/783, 800; 14/69.5, 71.1; 70/62, 203, 237, 238, 253, 258; 296/37.6; 414/537, 538

[56] References Cited

U.S. PATENT DOCUMENTS

| | | | |
|---|---|---|---|
| 1,333,093 | 3/1920 | Pierce | 70/203 |
| 3,190,090 | 6/1965 | Zaidener | 70/203 |
| 3,245,239 | 4/1966 | Zaidener | 70/202 |
| 3,355,136 | 11/1967 | Staples | 248/352 |
| 3,435,646 | 4/1969 | Michnoff | 70/203 |
| 3,511,393 | 5/1970 | Abromavage et al. | 414/537 |
| 3,550,409 | 12/1970 | Pariser | 70/203 |
| 3,559,826 | 2/1971 | Abromavage et al. | 414/537 |
| 3,690,131 | 9/1972 | Davis | 70/238 X |
| 3,713,662 | 1/1973 | Abromavage et al. | 280/783 |
| 3,777,518 | 12/1973 | Meyers | 70/200 |
| 3,822,573 | 7/1974 | Meyers | 70/200 |
| 3,836,174 | 9/1974 | Holman, Jr. | 403/166 X |
| 3,898,823 | 8/1975 | Ludeman | 70/200 |
| 4,116,297 | 9/1978 | Ross et al. | 70/237 X |
| 4,198,187 | 4/1980 | Mountz | 280/800 X |
| 4,432,432 | 2/1984 | Martin | 70/238 X |
| 4,685,857 | 8/1987 | Goeser et al. | 414/537 X |
| 4,792,168 | 12/1988 | Kardosh | 292/288 |
| 4,819,461 | 4/1989 | Pearson | 70/14 |
| 4,915,437 | 4/1990 | Chevry | 296/37.6 |
| 4,941,703 | 7/1990 | Curry | 296/37.6 |

FOREIGN PATENT DOCUMENTS 529549 11/1921 France .
1269513 4/1972 United Kingdom ................ 70/238

Primary Examiner—Andres Kashnikow
Assistant Examiner—Brian L. Johnson
Attorney, Agent, or Firm—Spensley, Horn, Jubas & Lubitz

[57] ABSTRACT

A method and system is provided for blocking the access opening to a loading ramp storage space in a truck body to prevent theft of the ramp. The system employs a pair of telescoped blocking members having forks on the distal ends thereof. The forks are adapted to engage opposed frame members at the access opening. One of the blocking members has a series of holes therethrough to receive the hasp of a lock to limit telescopic movement of the blocking members. With the forks in place on the opposed frame members and the lock hasp in place the blocking members extend across the access opening and prevent removal of the ramp.

13 Claims, 1 Drawing Sheet

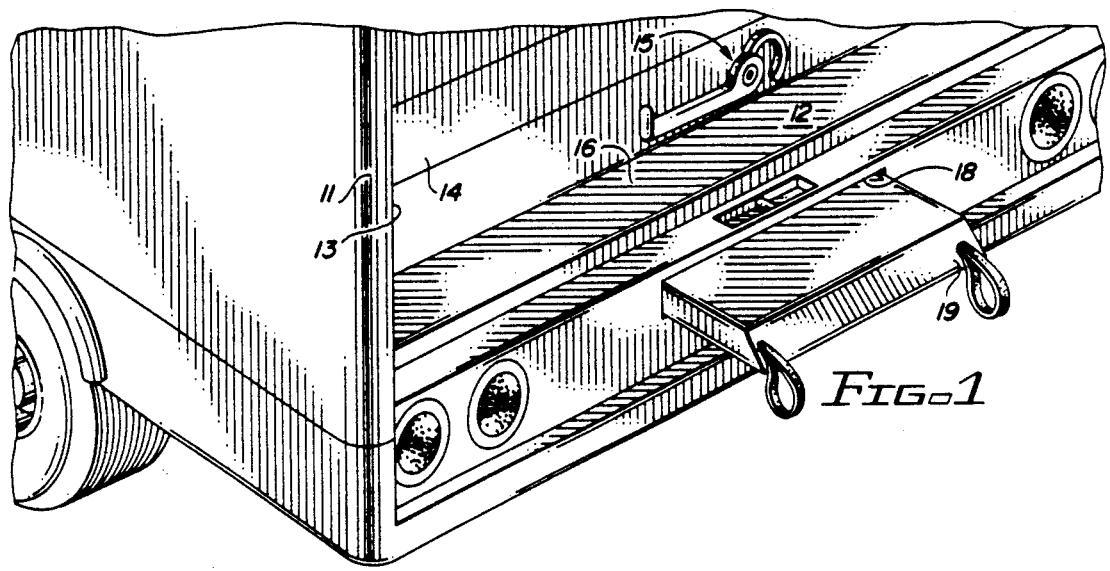
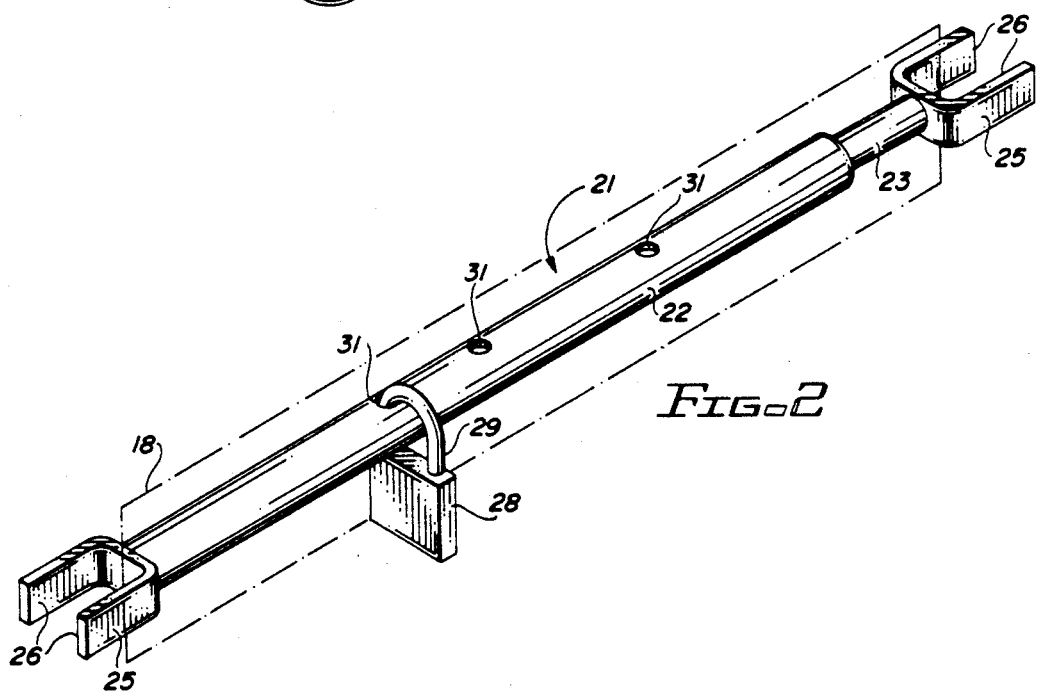
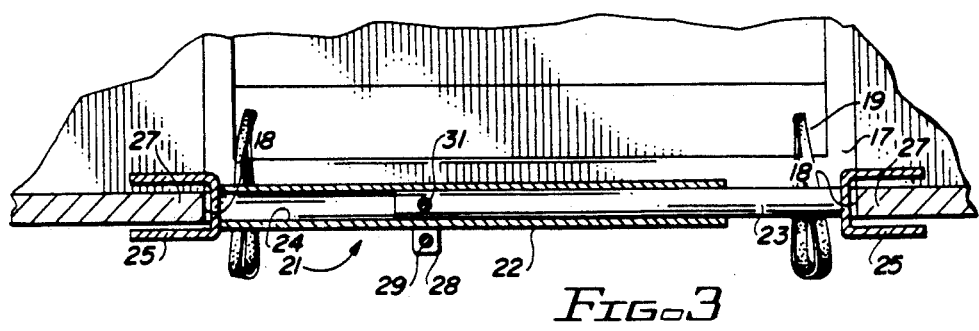

TRUCK RAMP ANTI-THEFT SYSTEM

TECHNICAL FIELD

This invention is concerned with the security and safety with which a ramp for loading and unloading a truck is stored within the truck.

BACKGROUND ART

It has been common practice for sometime in the truck rental industry to supply with the truck a ramp to facilitate loading and unloading the truck. A significant advance was made in this art when inventors recognized the possibility of providing a storage space for the ramp beneath the truck floor between the longitudinal frame members of the truck chassis.

Storage of the ramp in the frame of the truck offers several advantages. Such storage is outside the cargo space so it does not take up that valuable space nor interfere with articles stored in the cargo space. Furthermore, this storage arrangement positions the ramp at the rear of the truck immediately beneath the floor of the truck body where it is accessible to the user who merely needs to withdraw the ramp from its storage space and place it in use.

Representative prior art arrangements for frame storage of ramps are disclosed in a series of three United States patents granted to John C. Abromavage and Henry S. Shattles, namely: U.S. Pat. No. 3,511,393 granted May 12, 1970 for "RAMP ASSEMBLY"; U.S. Pat. No. 3,559,826 granted Feb. 2, 1971 for "AUTOMOTIVE CHASSIS"; and U.S. Pat. No. 3,713,662 granted Jan. 30, 1973 for "CHASSIS WITH STORAGE SPACE".

All of the aforementioned Abromavage et al patents disclose releasable latches for locking the ramp in its stored position to prevent accidental dislodgement of the ramp when the truck is moved. There are no provisions, however, for locking the latches themselves. Consequently, with the arrangements of the '826 and '662 patents the ramps are exposed to theft when the truck is left unattended. In the '393 patent a rather elaborate and costly set of pivoted arms prevent the ramp from becoming completely detached from the truck.

Theft of loading ramps has become a major problem for operators of truck rental fleets. For ease of handling such ramps are usually made of aluminum which has considerable scrap metal value and encourages theft.

In an application for a United States Patent filed by William J. Curry on Apr. 10, 1989, Ser. No. 07/335,749 now U.S. Pat. No. 4,941,703 for an invention entitled "TRUCK RAMP STORAGE SYSTEM" and assigned to the same assignee as the present application, there is disclosed a system for interconnecting a latch on the truck body access door with a ramp movement blocking member. With this system, when the door is latched the ramp, if properly stored, is blocked against removal from its storage space beneath the floor of the truck. When the user locks the door latch he automatically locks the ramp in storage.

A disadvantage of the Curry system is the inability to transfer the system from one truck to another. In some instances the greatest risk of ramp theft occurs when the vehicle is in a storage yard at the rental facility. The risk is considerably less when the vehicle has been rented and is being attended to by the renter. There is a need, therefore, for a ramp anti-theft system which can be easily applied to trucks in storage, but can be removed when the trucks are rented and applied to other returned vehicles.

DISCLOSURE OF THE INVENTION

The system and method of this invention employs ramp movement blocking means which can be locked in place across the access opening to the ramp storage space. The blocking means can also be unlocked and removed for use on another vehicle.

In general, one aspect of the invention is used in combination with a truck having a frame, the frame having an opening through which a ramp can pass, the opening being defined by opposed frame members. The invention consists of a system for blocking passage of the ramp through the opening, the system comprising means for blocking the opening, the blocking means including a blocking member having a body, the body having opposed ends; and connecting means, connected to the opposed ends of the body, for connecting the blocking member to the opposed frame members, the connecting means being movable with respect to each other from a first position whereby the connecting means are connected to the frame members so that the blocking member blocks passage of the ramp through the opening, to a second position whereby the connecting means are unconnected and removed from the frame members such that the ramp can pass through the opening; and locking means, connectable to the blocking member, for locking the connecting means into the first position, the locking means being operable by a key or a combination. Preferably, the connecting means comprise fork-shaped bodies shaped to engage the frame members of the truck.

Preferably, the blocking means comprises a pair of telescopic blocking members having forks at their distal ends for engaging opposed frame members at the access opening. One of the blocking members has a series of holes therethrough to receive the hasp of a lock to limit telescopic movement of the blocking members. With the forks in place on the opposed frame members and the lock in place the blocking members extend across the access opening and prevent removal of the ramp.

Another aspect of the present invention is directed to a method for blocking an object such as a ramp from passing through an opening in a truck frame. The method includes the steps of providing a blocking member having a body having opposed ends, the ends having connected thereto means for connecting the blocking member to a portion of the frame defining the opening, the connecting means being movable with respect to each other; sliding the connecting means into engagement with the frame portions such that the blocking member is connected to the frame member across the opening; and locking the blocking member so that the connecting means cannot be moved with respect to each other.

BRIEF DESCRIPTION OF THE DRAWINGS

The invention is described in greater detail hereinafter by reference of the accompanying drawing wherein:

FIG. 1 is a fragmentary perspective view of the rear of a truck body having a ramp storage space beneath the deck of the cargo space;

FIG. 2 is a perspective view of blocking means employed in the ramp anti-theft system of this invention; and FIG. 3 is a horizontal sectional view showing the blocking means installed on the truck body.

BEST MODES FOR CARRYING OUT THE INVENTION

Referring to FIG. 1, the reference numeral 11 identifies a truck body having a cargo space 12. The cargo space is provided by a rear opening 13 in the truck body. A vertically movable door 14 with a latch 15 is employed to close the cargo space access opening.

Beneath the deck 16 of cargo space 12 is a ramp storage space 17 (see FIG. 3) having an access opening 18 defined in part by opposed frame members 27. A ramp 19 employed to load and unload the truck is stored when not in use by sliding it through access opening 18 into the ramp storage space 17.

Loading ramps 19 for rental vehicles are made in different widths and lengths depending upon the size and construction of the vehicles with which they are associated. A typical ramp 19 may be 180 inches long by 24 inches wide and comprise some 100 pounds of aluminum. As such, it is a tempting object for theft simply for its scrap value. The principal objective of this invention is the prevention of theft of such ramps. This is accomplished by providing means, indicated generally by reference numeral 21 in FIGS. 2 and 3, for blocking the storage space access opening 18 to prevent removal of the ramp 19 through that opening.

The blocking means 21 comprises a pair of telescoped blocking members 22 and 23. Blocking member 22 is of tubular construction for telescopically receiving rod-like member 23 which has a cross-sectional configuration sized to closely fit within the interior 24 of member 22. Mounted at the distal end of each of the blocking members 22 and 23 is a U-shaped fork 25, preferably having parallel tines 26.

Forks 25 on blocking members 22 and 23 are of a size such that the space between their tines 26 is capable of receiving opposed frame members 27 on a truck body 11 at opposite sides of and partially framing storage space access opening 18.

Blocking member 23 can be telescoped into blocking member 22 to permit the tines of forks 25 to clear the opposed frame members 27. Blocking member 23 is then extended from member 22 until the forks 25 engage the opposed frame members 27. The blocking means is locked in place in this position by means of a lock 28 having a hasp 29 adapted to pass through one pair of a series of pairs of openings 31 along blocking member 22. Each opening 31 shown in FIG. 2 has a twin (not shown) opposite it on the underside of member 22.

With the lock hasp 29 passing through the openings in blocking member 22 member 23 is prevented from being telescoped into member 22 to shorten the distance between the forks 25. This prevents removal of the blocking means 21 from access opening 18 and in turn prevents removal of the ramp 19. Lock hasp 29 can be caused to pass through an opening 32 in the end region of blocking member 23 as shown in FIG. 3, or the hasp may simply abut the end of the member 23 to prevent movement of the latter into member 22. The lock may be of the padlock or combination type.

The series of openings 31 in blocking member 22 permit adjustment of the distance between forks 25 to accommodate access openings of different widths. Thus, the blocking means 21 can be used with different vehicles having different sized ramp storage access openings.

As is apparent from the foregoing specification, the present invention is capable of being embodied with various alterations and modifications from those described above. For this reason, it is to be fully understood that all of the foregoing is intended to be merely illustrative and is not intended to limit, in any manner, the scope of the invention as set forth in the following claims.

What is claimed is:

1. In combination a truck body having a cargo space therein, a ramp usable to gain access to said cargo space, a storage space in said truck body for said ramp, said ramp storage space having an access opening thereto open to the exterior of said truck body, said ramp being insertable into and removable from said ramp storage space through the storage space access opening, said truck body having opposed members partially framing said storage space access opening, and means for blocking said storage space access opening to prevent removal of said ramp from said storage space, said blocking means comprising first and second elongated blocking members, said first blocking member being telescopically received in said second blocking member, a fork carried at the distal end of each of said first and second blocking members, the telescopic movement of said first and second blocking members permitting the distance between said forks to be adjusted whereby said forks can be brought closer together to clear the opposed members at said storage space access opening and moved farther apart so that said forks respectively receive said opposed members, a lock having a hasp, at least one of said blocking members having a series of holes along the length thereof for receiving the hasp of said lock, said hasp positioned within one of said holes to limit the extent to which said first blocking member is telescoped into said second blocking member and to prevent removal of said blocking means from said storage space access opening when said forks receive said opposed members.

2. In a truck having a frame, the frame having an opening through which a ramp can pass, the opening being defined by opposed frame members, the improvement consisting of a system for blocking passage of the ramp through the opening, the system including:
    means for blocking the opening, the blocking means comprising:
        a blocking member having a body, the body having opposed ends; and
        connecting means, connected to the opposed ends of the body, for connecting the blocking member to the opposed frame members, the connecting means being movable with respect to each other from a first position whereby the connecting means are connected to the frame members so that the blocking member blocks passage of the ramp through the opening, to a second position whereby the connecting means are unconnected and removed from the frame members such that the ramp can pass through the opening; and
    locking means, connectable to the blocking member, for locking the connecting means into the first position, the locking means being operable by one of a key and a combination.

3. The system according to claim 2 wherein the connecting means comprises forked-shaped bodies shaped to engage the frame members of the truck.

4. The system according to claim 2 wherein the blocking member comprises a pair of telescoping tubes slidable with respect to each other.

5. The system according to claim 4 wherein the tubes have a series of openings spaced along a portion of the length of the tubes.

6. The system according to claim 4 wherein the connecting means comprises fork-shaped bodies shaped to engage the frame members of the truck.

7. The system according to claim 6 wherein each of the fork-shaped bodies includes a pair of parallel tines.

8. The system according to claim 2 wherein the locking means is a padlock.

9. The system according to claim 2 wherein the locking means is a combination lock.

10. A method for blocking an object from passing through an opening in a truck frame, the method comprising the steps of:

providing a blocking member having a body with opposed ends, the ends having connected thereto means for connecting the blocking member to opposed portions of the frame defining the opening, the connecting means being movable with respect to each other;

moving the connecting means with respect to each other into engagement with the frame portions such that the blocking member is connected to the frame member across the opening; and locking the blocking member so that the connecting means cannot be moved from engagement with the frame portions.

11. The method according to claim 10 wherein the object is a ramp.

12. The method according to claim 10 wherein each of the connecting means comprises a fork shaped to engage a portion of the truck frame defining the opening.

13. A method for blocking a ramp from passing through an opening in a truck frame, the method comprising the steps of:

providing a body defined by a pair of elongated blocking members associated with each other and slidable with respect to each other, each of the blocking members having a free end, the free ends being opposed to each other, each free end being shaped to engage a portion of the truck frame defining the opening;

sliding the blocking members with respect to each other so that the opposed free ends engage opposed portions of the truck frame and so that the blocking members are positioned across the opening; and locking the blocking members together so that the body cannot be removed from engagement with the frame portions.

* * * * *